Figure 1:
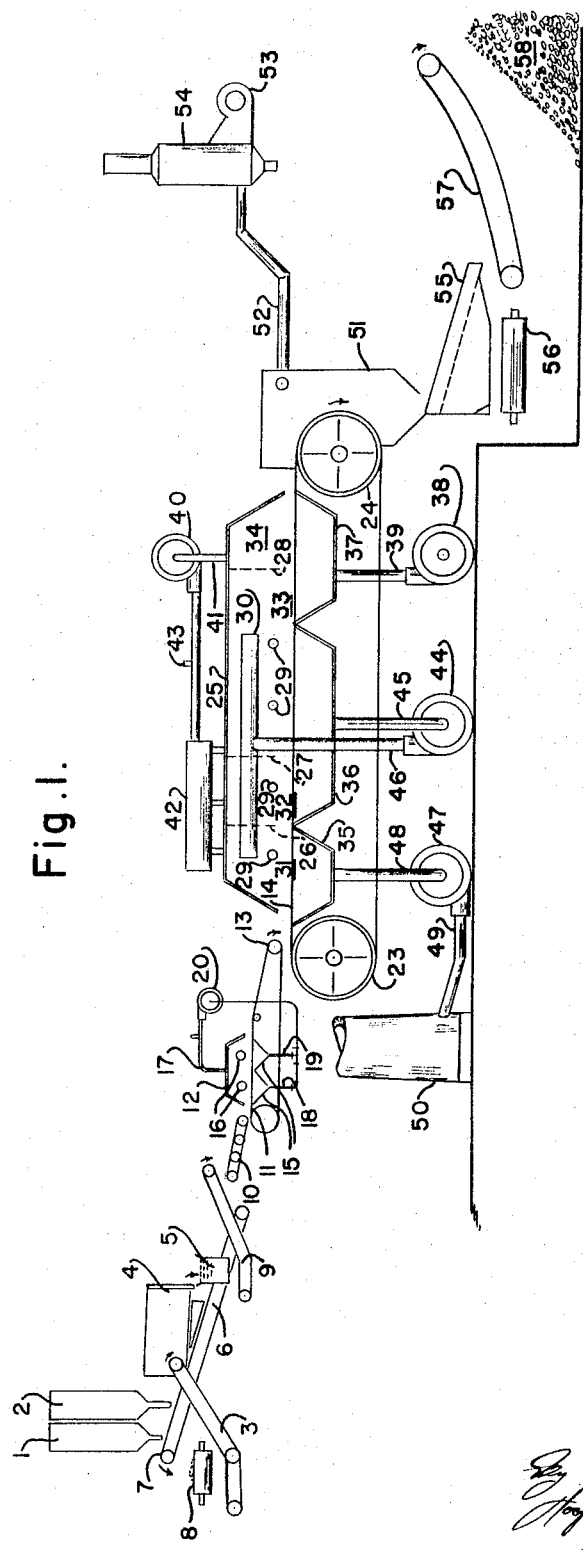

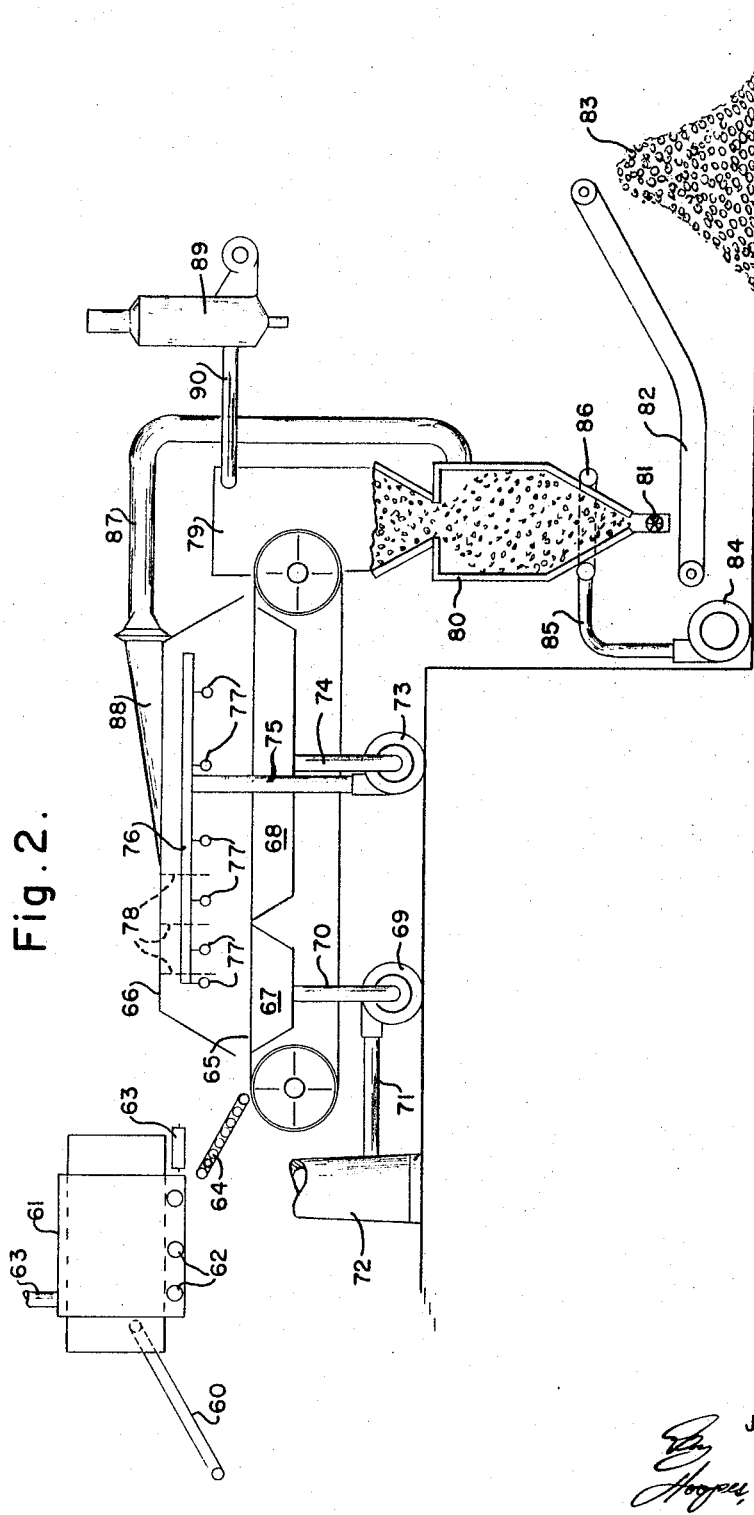

United States Patent Office 3,319,346
Patented May 16, 1967

3,319,346
METHOD AND APPARATUS FOR HEAT TREATING MOISTURE BEARING PARTICLES
John E. Schuster, 2809 Greenleaf, Allentown, Pa. 18104
Filed Sept. 29, 1964, Ser. No. 399,963
11 Claims. (Cl. 34—28)

This invention relates to heat treatment of moisture bearing particles such as metal bearing ores, limestone, phosphate rock, cement and the like, and is particularly useful in indurating green mineral containing pellets.

Heat treatment of moisture bearing particles is well known and has been carried out for many years. The process is variously known as drying, roasting, baking, heating, calcining, indurating, and the like, and may also be carried out for the purpose of oxidation of lower oxides and reduction of higher oxides. Various forms of apparatus have been employed, one of those commonly used being the gas permeable traveling grate. A traveling grate is advantageaus in that the solids are at rest during the heat treatment, thereby avoiding mechanical shock and degradation. It is further advantageous in that the heating cycle is readily controlled, and the packing of the particles on the grate in a bed provides good heat transfer.

Use of a traveling grate also has certain drawbacks, however. Hot gases are passed through the moist solids on the grate. The gases serve both to heat the solids and evaporate moisture from them, and also to serve as a medium to carry evaporated moisture from the solids in the bed. When the bed is too deep, moisture evaporated by the gases in their initial contact with the particles may be recondensed on the particles as further contact with the cool particles chills the gases below the dewpoint. The deposition of further liquid upon the already moist particles produces undesirable and deleterious effects.

Typical examples of the problems which arise are those encountered in forming the heat hardening finely divided mineral solids into larger discrete pellets, herein called pelletizing. The usual purpose is to enable fines, which are largely unmanageable, to be readily handled and to be charged into a furnace in such form that a large percentage of the charge will not be lost as dust. The pellets are usually formed by agglomerating fine particles of mineral bearing material with moisture into pellet form. If adequate moisture is not present in the raw material, it may be added at the time the pellets are formed. A small amount of bentonite or the like is sometimes added. The pellets are usually formed in a balling drum, but the process may also be carried out by briquetting, pressing, extruding, or the like. The pellets are then customarily heat treated to bring them to a sufficiently high temperature to cause grain growth or slagging within the pellet, whereby the pellet is hardened to such a degree that it can readily be shipped and handled. Pellets which have not been hardened are customarily known as, and are referred to herein as "green" pellets. The pellets are commonly heated by passing hot gases over them. When moist green pellets are placed upon a traveling grate and heated too rapidly, large quantities of moisture are evaporated from the green pellets and then condensed deeper in the bed as the heating gases cool to their dewpoint in passage through the bed of cool pellets. This condensed moisture causes scrubbing of the pellets, washes out fines and partially or completely blocks passage of air through the pellets by the accumulation of the fines and water or by collapsing the moist green pellets themselves through absorption of the condensation. When the green pellets are heated too slowly to avoid excessive condensation, the capacity of the apparatus is limited and a larger installation is needed for the requisite production. Another problem has been that when the green pellets are still moist, the heating gas exits from the bed at about the same temperature as the moist green pellets. At this low temperature only a small quantity of moisture can be carried per unit of heating gas thus requiring that a comparatively dry heating gas be used. Maintaining a dry heating gas in the process requires larger volumes of new air additions and a balancing exhausting of more heating gases than might otherwise be needed with the resultant higher heat losses.

In order to avoid these and like problems, it has been the common practice to divide the grate into a large sized first zone where the green pellets are at least partially dried with medium temperature gases, usually about 500° F., before they are passed into the heating zone. It is also common practice to limit the bed depth to about 12 inches and to reverse the direction of air flow to avoid condensing excessive moisture in the bed. These and various other expendients have also been proposed, either singly or in combination. All of them, however, have the effect of reducing the capacity of the traveling grate. Since a traveling grate is expensive, any reduction in its capacity adds significantaly to the cost of processing. Furthermore, some such expedients have the effect of adversely affecting the quality of the product being produced.

I have invented new and useful methods and apparatus for the rapid, efficient, and economical heating of moisture bearing particles with a substantially smaller plant installation and lower fuel consumption than would otherwise be required for the same daily capacity. I heat moisture bearing particles to a mild temperature below the boiling point of water while surrounding the particles with a vapor pressure at least as great as the vapor pressure of heating gas when saturated and at the temperature of the particles. I thereafter heat said particles to a tempreature substantially above the boiling point of water. I preferably carry out the mild heating of the particles in a first heating zone and thereafter transfer the particles to a second heating zone for intensive heating above the boiling point of water. I preferably recirculate a gaseous medium through the moist particles in the first heating zone, maintaining the gases in heated condition and limiting the extent to which the circulating gases contact the moist particles before reheating. I prefer to maintain the vapor pressure of the recirculating gases at an elevated temperature whereby the vapor pressure of the gases is at least as great as the vapor pressure of said gases would be if saturated and at the temperature of the moist particles. I thereby heat the particles without appreciable evaporation of moisture therein. I preferably transfer the moist particles in heated condition to a secondary heating zone, layer them into a gas permeable bed of substantial depth and pass hot gases therethrough, said gases being employed to heat the particles to a temperature above the boiling point of water. I maintain the gases above their dewpoint while passing through the gas permeable bed in the secondary heating zone.

I further prefer to pass the heated particles from the secondary heating zone to a cooling zone and there recuperate heat from the particles by heating cooling air for subsequent heating of the mildly heated moist particles. I preferably pass the cooling gases through the heated particles crossflow to the direction of movement of the particles. I may deliver the heated particles from the secondary heating zone to a cooling zone where the heated particles are placed in a bed of very great depth. In this form of my invention, the cooling gases are passed upwardly counterflow through the bed and heated thereby, and cooled particles are withdrawn from the bottom of the bed.

I prefer to provide primary heating means wherein moist particles are heated to a mild temperature. I provide heating means associated with the primary heating means and prefer to provide gas circulating means for circulation of hot gases through the particles positioned in the primary heating means. I prefer to displace mildly heated moist particles from the primary heating means to secondary heating means. I preferably layer particles from the primary heating means into a gas permeable bed of substantial depth upon a traveling grate positioned within the secondary heating means. I further provide heating means associated with the secondary heating means to supply heat to the particles within the secondary heating means. I further prefer to provide gas circulating means in operative connection with the secondary heating means for circulation of hot gases through the particles within the secondary heating means. I further provide means to circulate cool gases through the heated paritcles for concurrent heating of the cool gases and cooling of the hot particles.

Other details, objects, and advantages of my invention will become more apparent as the following description of certain present preferred embdoiments thereof proceed.

In the accompanying drawings, I have illustrated in diagrammatic form certain present preferred embodiments of apparatus for practice of my invention in which:

FIGURE 1 shows a diagrammatic representation of a pelletizing plant embodying the invention; and FIGURE 2 shows a diagrammatic representation of another form of pelletizing plant embodying the invention and having some parts similar to those shown in FIGURE 1.

In the plant shown in FIGURE 1, a mineral bearing ore such as iron ore in the form of fine particles is maintained in a supply silo 1. Bentonite is maintained in a supply silo 2. The silos are arranged to discharge onto a continuous belt conveyor 3 which carries the ore and bentonite into rotating balling drum 4. Drum 4 is of conventional construction and rolls the material into pellets of suitable size, normally in the range of ⅜ to ¾ inch in diameter. Moisture is also supplied, either with the ore and bentonite, or separately so that the pellets which are formed comprise about 10% moisture by weight. The moisture serves to hold the fine particles together and to supply sufficient plasticity to enable the pellets to be handled further. The formation of green pellets is well known and need not be described in detail here.

The moist, green pellets are discharged from drum 4 onto a screen 5. Undersized pellets pass through the screen onto a continuous belt conveyor 6 which carries the pellets back to the entry end of the apparatus. The pellets are discharged over head pulley 7 of conveyor 6 onto a cross-conveyor 8 which deposits them upon conveyor 3. They are then recirculated through balling drum 4 and agglomerated with further material until they reach desired size. Pellets deposited on screen 5 which pass over the screen go onto a conveyor 9 which deposits the pellets upon a roller conveyor 10. Roller conveyor 10 in turn layers the pellets upon a continuous moving conveyor 11 formed of gas permeable material such as a woven wire mesh belt. Pellets on conveyor 11 pass under the hood 12 and are discharged over head pulley 13 onto a traveling grate 14. Hood 12 defines a primary heating zone. Wind boxes 15 are located beneath conveyor 11 and under hood 12, and burners 16 are positioned within hood 12 to supply heat. A gaseous atmosphere is added to hood 12 through a pipe 17 and is withdrawn through pipes 18 and 19 which are connected to the intake of a fan 20. Although the atmosphere will contain various combustion products and the like, it is predominantly air and for simplicity is referred to as air without regard to the constituents of the atmosphere. Fan 20 discharges in turn to pipe 17. Accordingly, air is recirculated into hood 12, through the bed of pellets upon conveyor 11, and into wind boxes 15 by fan 20. A certain amount of the air may be bled off, either deliberately or by leakage, and necessary make up air supplied.

Traveling grate 14 passes over pulleys 23 and 24. A hood 25 is positioned above the grate. Hood 25 broadly defines a secondary heating zone and cooling zone. The hood is divide dinto sections by internal baffles 26, 27 and 28. The sections into which the space under hood 25 is divided comprise several distinct secondary heating zones and a cooling zone. Burners 29 are provided beneath hood 25 and are mounted upon an air distributing manifold 30. One heating zone 31 is formed between the entrance end of hood 25 and baffle 26. A second heating zone 32 is provided between baffles 26 and 27 and further heating zone 33 is provided on the other side of baffle 27. A cooling zone 34 is provided between baffle 28 and the exit end of hood 25, and on the opposite side of baffle 28.

Wind boxes 35, 36 and 37 are porvided beneath grate 14 and beneath hood 25.

A fan 38 discharges atmospheric air through pipe 39 into wind box 37. A fan 40 is connected on its suction side through a pipe 41 to cooling zone 34. The discharge side of fan 40 is connected to a distributing manifold 42 from which a pipe leads into each of heating zones 31, 32, and 33. A bleed 43 is provided between the fan discharge and manifold 42 to enable excess air from cooling zone 34 to be vented to the atmosphere. The suction side of a fan 44 is connected through pipe 45 to wind box 36. The discharge of fan 44 passes through pipe 46 to manifold 30 which distributes heated air to heating sections 31, 32, and 33. A fan 47 has its suction side connected to wind box 35 by pipe 48. Fan 47 discharges through pipe 49 to exhaust stack 50.

Pellets discharged from the traveling grate 14 pass into a dust hood 51. Air is withdrawn from the top of hood 51 through pipe 52 to a fan 53 and then delivered to dust collector 54. The cleaned air is then discharged to the atmosphere. Hardened pellets are discharged onto a screen 55. Undersized pellets are carried off by a conveyor 56 while those which pass over the screen are carried by a conveyor 57 to a stock pile 58.

The apparatus shown in FIGURE 2 is similar in many respects to the apparatus in FIGURE 1. Pellets are formed and sized in apparatus similar to that shown in FIGURE 1 and then delivered to a conveyor 60. Conveyor 60 discharges the pellets into a rotary kiln 61 for primary heating of the pellets. Kiln 61 is fired by burners 62, which exhaust through a vent 63. The kiln is substantially enclosed, so that there is little movement of air through the interior of the kiln in which the pellets are heated. After heating, the pellets are discharged from kiln 61 onto a cross conveyor 63, which deposits the heated pellets onto a roller conveyor 64. Conveyor 64 layers the pellets in a bed of substantial depth upon traveling grate 65. Grate 65 is covered by a hood 66 and has wind boxes 67 and 68 beneath. Hood 66 defines a secondary heating zone upon grate 65. A fan 69 is connected by duct 70 to wind box 67 and discharges through a duct 71 to chimney 72. Fan 73 has its suction side connected by duct 74 to wind box 68, discharges through duct 75 to a manifold 76. Burners 77 are positioned adjacent manifold 76. Partitions 78 are provided beneath hood 66 to divide the area beneath the hood into a plurality of heating zones. The forward movement of traveling grate 65 discharges the pellets upon it into a dust hood 79, from which the pellets pass downwardly into a shaft kiln 80. Shaft kiln 80 serves as a holding bin for pellets issuing from traveling grate 65. The pellets pass from shaft kiln 80 through a gate 81 onto conveyor 82, which delivers the pellets to a stock pile 83. A fan 84 blows atmospheric air through a duct 85, connecting to a bustle pipe 86, from which the air enters the bottom of shaft kiln 80. The air blows upwardly through heated pellets within kiln 80 and passes through duct 87 to a distributing duct 88, by which air delivered through duct 87 is distributed through hood 66 above wind box 68. A dust collector 89 is connected by a duct 90 to dust hood 79.

In operation of the apparatus shown in FIGURE 1, iron ore and small amounts of bentonite are discharged from their respective bins onto conveyor 3. They are fed into drum 4 where the rotary motion agglomerates them into pellets. It is customary to provide moisture, usually about 10% by weight, to bind the ore and bentonite together into the form of pellets. The moisture may be present within the raw materials in sufficient amount, but when the inherent moisture is not adequate, additional moisture is added to supply the requisite amount. As the pellets are formed, they are discharged from the opposite end of drum 4 onto screen 5. Undersized pellets pass through the screen and are returned by conveyors 7, 8 and 3 to drum 4 for further agglomeration with the raw materials to form pellets of adequate size. The pellets which pass over screen 5 are carried by conveyor 9 to conveyor 10 which layers them onto permeable conveyor 11 in a shallow bed approximately three inches thick. The bed is then carried forward through the primary heating zone under hood 12 by forward motion of conveyor 11. Air is drawn from wind boxes 15 by fan 20 and then delivered to hood 16 and returned through the bed of pellets back to the wind boxes. Heat is added by burners 16 to the recirculating air. As the air circulates over the moist pellets, moisture in the pellets is prevented from evaporating by maintaining a vapor pressure in the heating gases greater than the vapor pressure of the moist pellets, and by control of the grate speed. Since the bed of pellets on conveyor 11 is of shallow depth, the air passes through without being cooled excessively. The vapor pressure in the circulating air is maintained at least as great as the vapor pressure of the gas would be if it were saturated and at the temperature of the warmest pellets on conveyor 11. Because the vapor pressure of the air is higher than the partial or vapor pressure of the moisture in the pellets, no moisture will be evaporated from the pellets into the air. Heat is transferred from the air to the moist pellets. Since moisture is not evaporated, all of the heat raises the temperature of the pellets and no heat is required to supply heat of vaporization to the pellets. The sensible heat required is, of course, a small fraction of the heat of vaporization which would be necessary if the moisture were also vaporized. Accordingly, the temperature of the pellets is quickly raised by the addition of small amounts of heat and the recirculating gas is not chilled to cause moisture in it to recondense due to the shallow bed depth. In this manner, the pellets are heated to a mild temperature of perhaps 150–160° F. while retaining substantially their entire moisture content.

The mildly heated pellets are then discharged onto traveling grate 14, where they are deposited in a bed of substantial thickness, preferably from about twelve to thirty inches deep. Hot air at optimum velocity is drawn downwardly through the bed and into wind box 35. Heat will first be absorbed into the upper layer of the pellet bed and the bed will thereafter be dried and heated in successive layers toward the bottom of the bed. After the initial drying of the top pellets, the pellets in the lower layers are dried simultaneously as the pellets above are heated rather than side by side as in the current practice. The air which passes through the pellets on grate 14 initially may be heated to a temperature of about 400 to 900° F., the heating rate being limited to prevent too rapid vaporization of entrained moisture and consequent breaking up of the pellets, and the heating gas temperature is raised as rapidly as possible in successive zones to final indurating temperature. The amount of moisture which the hot air will evaporate, as well as the dewpoint of the air, may be found from available data and experiments so that the necessary minimum pellet temperature to prevent condensation in the bed can be determined. The moisture which can be carried by air rises very sharply in the range from about 100° F. upwardly. Accordingly, the dewpoint of the air has a relatively small variation for relatively large changes in moisture content in the temperature range of about 100° F.–200° F. Ordinarily, a pellet temperature of about 150–160° F. will prevent any condensation of moisture from the air with the usual heating cycles. Hence, as the air passes downwardly through the pellet bed upon grate 14, a portion of the contained energy will evaporate moisture from the top pellets, and thereafter the temperature of the top pellets will be raised, and the heating gases simultaneously be further cooled by drying and heating layers of pellets deeper in the bed. Since the temperature of the pellets has already been raised above the determined dewpoint of air passing through the bed, no condensation of moisture from the air takes place on the pellets. The moisture laden air is then discharged through chimney 50.

As the pellets move into secondary heating section 32, they are subjected to further heating by air supplied from manifolds 30 and 42, and additional heat is supplied by burner 29 in that section. The pellets in this section are subjected to higher temperatures. Thereafter the pellets pass to secondary heating section 33 where further heat is supplied. The exact heating cycle to which the pellets are subjected depends in large part upon the material making up the pellets. What is desired is to heat them to a temperature to bring about grain growth whereby the pellets are hardened. Such temperature may, for example, be about 2300 to 2500° F. Some ores can be raised to that temperature quite quickly. Others, such as those containing limstone and magnetite oxides must be held at intermediate temperatures long enough to permit thermic reactions and gases to penetrate or escape from inside the pellet.

After completion of heating, the pellets are moved toward cooling zone 34 where they are cooled by air and heat is recovered from them in the air. The gases heated from the pellets flow generally across the movement of the pellets and the heat is thereby recuperated. Pellets issuing from grate 14 pass through dust hood 51 from which dust is removed. The pellets themselves are then screened and stockpiled.

The operation of the apparatus shown in FIGURE 2 is alike in material respects and the operation is referred below only to the extent that it differs. In heating kiln 61, heat is supplied while the pellets are surrounded by a moist gas. In this manner, the pellets are heated without drying. In passing through the secondary heating zone, they are usually subjected to successively higher temperatures in succeeding sections under hood 66.

The recovery of heat in kiln 80 is accomplished in a counterflow manner and permits containing the same quantity of heat in about ½ the air volume as is required for like cooling upon the grate as shown in FIGURE 1. The average temperature of the recuperated air being delivered through wind box 34 is about intermediate the exit temperature of the pellets and the temperature to which they are finally heated, some of the air passing through pellets at each of the temperatures. In kiln 80, all of the air delivered by fan 84 passes successively through coolest pellets and upwardly through the warmest pellets. When a balanced quantity of cooling air is used, the exit temperature approaches the temperature of the fully heated pellets for a comparable cooled pellet temperature. Hence, a smaller volume of air is heated to a higher temperature enabling a like smaller amount of gases that need to be exhausted from the system by fan 69 to maintain the system's air balance. Because of the ability of this invention to heat and dry in the heating zone with relatively moist gases, the process can be readily operated on that minimum amount of new air which is needed to cool. This smaller exhaust volume results in a substantial heat savings. Kiln 80 also serves to hold the pellets at elevated temperature for a time, thereby permitting grain growth within the particles.

The invention may be further practiced by distributing the fine particles in a slurry. The slurry is heated and then excess moisture is extracted from the solids in a vacuum filter or the like. The filter cake comprises moist agglomerated fines which have been so heated and are already at elevated temperature. In this manner, primary heating takes place when the particles are in slurry form. The filter cake is then agglomerated and transferred for heating in a secondary heating zone as previously described.

While I have illustrated and described certain presently preferred embodiments of my invention, and methods of practicing the same, it is to be understood that I do not limit myself thereto and that my invention may be otherwise variously practiced within the scope of the following claims.

I claim:

1. The method of heat treating moisture bearing particles which comprises heating the particles in a first zone to a mild temperature below the boiling point of water, in the first zone surrounding the particles, generally maintaining a vapor pressure at least as great as the vapor pressure of heating gas when saturated and at the temperature of the heated particles in the first zone, and then further heating said particles in a second zone to a temperature substantially above the boiling point of water, said method being characterized by heating of particles in the first zone without substantial evaporation of moisture from said particles.

2. The process of heat treating moisture containing mineral particles which comprises placing the particles in a gas permeable bed of relatively shallow depth in a first heating zone, heating the particles to a mild temperature below the boiling point of water by passing hot gases through the bed, said gases having a vapor pressure at least as great as the vapor pressure of said gases when saturated and at the temperature of the heated particles, transferring the mildly heated particles to a second heating zone, placing the particles in a bed deeper than the bed in the first heating zone, and further heating the particles in the second zone by passing hot gases through the bed at a temperature substantially above the boiling point of water.

3. The method of heat treating moisture bearing particles which comprises placing said particles in a first heating zone, heating substantially all the particles to a mild temperature below the boiling point of water, surrounding the particles in the first heating zone with a heated gas whose vapor pressure is at least as great as the vapor pressure of said gas when saturated and at the temperature of the heated particles, transferring the heated particles to a second heating zone, there placing the particles in a gas permeable bed and further heating the particles to a temperature substantially above the boiling point of water.

4. The method of heat treating moisture bearing particles which comprises heating the particles while in the form of a water borne slurry to a mild temperature below the boiling point of water in a first heating zone, extracting excess water from the heated slurry, agglomerating the particles, and then transferring the agglomerated particles to a second heating zone in a gas permeable bed and there passing heated gases through the bed and further heating the agglomerated particles to a temperature above the boiling point of water, said method being characterized by heating of particles in the first zone without substantial evaporation of moisture from said particles.

5. The method of heat treating finely divided moisture bearing mineral particles which comprises agglomerating and mildly heating said particles while surrounding the particles with a gas having a vapor pressure at least as great as the vapor pressure of the gas when saturated and at the temperature of the heated particles, whereby mildly heated moist, green pellets are formed, disposing the mildly heated pellets in a gas permeable bed and passing hot gases therethrough until the pellets are heated to a temperature substantially above the boiling point of water.

6. The method of heat treating moisture bearing particles which comprises heating the particles in a first zone to a mild temperature below the boiling point of water in the presence of a gas whose vapor pressure is at least as great as the vapor pressure of said gas when saturated and at the temperature of the mildly heated particles, further heating the particles in a second zone to a temperature substantially above the boiling point of water by passing hot gases through a bed of said particles, and thereafter passing cool air over the hot particles and recuperating heat therefrom for further heating of the mildly heated particles.

7. The method of heat treating moisture bearing particles which comprises heating the particles in a first heating zone to a mild temperature below the boiling point of water in the presence of a gas whose vapor pressure is at least as great as the vapor pressure of said gas at saturation and the temperature of the mildly heated particles, thereafter heating the particles in a secondary heating zone by passing hot gas therearound, and heating the particles to a temperature substantially above the boiling point of water, then holding said particles at elevated temperature, and finally cooling them by flowing gas therethrough counterflow to the particles and recuperating heat from the particles.

8. The method of heat treating moisture bearing particles which comprises heating the particles to a temperature below the boiling point of water in a mosiure laden atmosphere whose vapor pressure exceeds the vaporization pressure of the moisture in the particles, and thereafter further heating the particles to a temperature above the boiling point of water.

9. The method of heating treating moisture bearing particles which comprises placing said particles in a bed in a primary heating zone, passing heated moisture laden recirculating gas through the bed of particles in the primary heating zone and cooling the gas to a temperature greater than the dewpoint of the gas while mildly heating the particles to a temperature not greater than that of the dewpoint of the gas, transferring the mildly heated particles from the primary heating zone to a bed in a secondary heating zone, there passing successively hotter gases downwardly through the bed in the secondary heating zone, thereby evaporating moisture carried by the particles and heating the particles to a temperature above the boiling point, then transferring the heated particles from the secondary heating zone to a cooling zone, blowing gas through the heated particles for transfer of heat to the gas and then using said gas for heating of the particles in the secondary heating zone.

10. Particle heat treating apparatus comprising a first particle heating chamber, conduit means extending from a point in the chamber on one side of particles therein to a point in the chamber on the other side of such particles, fan means operable to recirculate gas through said chamber, through particles therein, and through said conduit means, heat supply means in position to heat gas recirculating through said chamber, a second substantially closed particle heating chamber positioned to receive particles discharged from said first particle heating chamber, conduit means connected to said second chamber between a point on one side of particles in said second chamber and a point on the other side of the particles in said second chamber for recirculation of gas through said particles, a particle cooling chamber, conduit means extending between said cooling chamber and said second heating chamber for introduction of preheated gas into said heating chamber after passage over particles in said cooling chamber, and exhaust means connected to said second heating chamber for exhaust of moisture laden gas therefrom.

11. Particle heat treating apparatus comprising a first particle heating chamber, conduit means extending from a point in the chamber on one side of particles therein to a point in the chamber on the other side of such particles, fan means operable to recirculate gas through said chamber, through particles therein, and through said conduit means, whereby the recirculating gas is moisture laden and non-receptive to moisture borne by the particles, heat supply means in position to heat gas recirculating through said chamber, a second substantially closed particle heating chamber disposed to receive particles from the first heating chamber, and including a traveling grate for support of particles in the second heating chamber, conduit means connected to said second chamber between a point on one side or particles in said second chamber and a point on the other side of the particles in said second chamber for recirculation of gas through said particles, a particle cooling chamber, conduit means extending between said cooling chamber and said second heating chamber for introduction of dry preheated air into said second heating chamber, heating means associated with the second heating chamber for supply of heat to particles in the second heating chamber, and exhaust means connected to said second heating chamber adjacent the place where moist particles are received from said first heating chamber for exhaust of moisture laden gas from the second heating chamber.

References Cited by the Examiner
UNITED STATES PATENTS

| | | | |
|---|---|---|---|
| 2,119,615 | 6/1938 | Wendeborn | 263—28 X |
| 2,580,235 | 12/1951 | Lellep | 263—36 X |
| 2,750,273 | 6/1956 | Lellep. | |
| 2,816,372 | 12/1957 | Myers et al. | 34—216 |
| 2,997,096 | 8/1961 | Morrison et al. | 34—216 X |
| 3,100,106 | 8/1963 | Bielenberg et al. | 236—28 X |
| 3,214,844 | 11/1965 | Oates et al. | 34—216 X |

FREDERICK L. MATTESON, Jr., *Primary Examiner.*

D. A. TAMBURRO, *Assistant Examiner.*

UNITED STATES PATENT OFFICE
CERTIFICATE OF CORRECTION

Patent No. 3,319,346                            May 16, 1967

John E. Schuster

It is hereby certified that error appears in the above numbered patent requiring correction and that the said Letters Patent should read as corrected below.

Column 1, line 20, for "advantageaus" read -- advantageous --; column 2, line 17, for "expendients" read -- expedients --; line 21, for "significantaly" read -- significantly --; column 3, line 17, for "paritcles" read -- particles --; line 21, for "embdoiments" read -- embodiments --; column 4, line 6, for "divide dinto" read -- divided into --; line 18, for "porvided" read -- provided --; column 6, line 31, for "limstone" read -- limestone --; column 7, line 10, for "presently" read -- present --; column 9, line 13, for "or" read -- of --; column 10, line 13, for "236-28 X" read -- 263-28 X --.

Signed and sealed this 21st day of November 1967.

(SEAL)
Attest:

EDWARD M. FLETCHER, JR.
Attesting Officer

EDWARD J. BRENNER
                                               Commissioner of Patents